United States Patent
Greenfield

(10) Patent No.: US 9,526,235 B1
(45) Date of Patent: Dec. 27, 2016

(54) FISHING HARNESS APPARATUS WITH ENHANCED BAIT SECUREMENT

(71) Applicant: Thomas Best Greenfield, Sonora, CA (US)

(72) Inventor: Thomas Best Greenfield, Sonora, CA (US)

(*) Notice: Subject to any disclaimer, the term of this patent is extended or adjusted under 35 U.S.C. 154(b) by 50 days.

(21) Appl. No.: 14/514,187

(22) Filed: Oct. 14, 2014

(51) Int. Cl.
  *A01K 83/06* (2006.01)
  *A01K 83/00* (2006.01)
  *A01K 85/01* (2006.01)

(52) U.S. Cl.
  CPC .............. *A01K 83/06* (2013.01); *A01K 83/00* (2013.01); *A01K 85/01* (2013.01)

(58) Field of Classification Search
  CPC ................................. A01K 83/06; A01K 85/14
  See application file for complete search history.

(56) References Cited

U.S. PATENT DOCUMENTS

| | | | | |
|---|---|---|---|---|
| 2,848,836 A * | 8/1958 | Dodd | ...................... | A01K 83/06 43/44.6 |
| 4,126,956 A * | 11/1978 | Bayer | .................... | A01K 83/06 43/4.5 |
| 4,501,087 A * | 2/1985 | Blomquist | .............. | A01K 85/14 43/42.06 |
| 4,848,023 A | 7/1989 | Ryder | | |
| 5,142,811 A | 9/1992 | Freeman | | |
| 6,041,538 A * | 3/2000 | Roemer | ................. | A01K 85/00 43/42.06 |
| 6,073,385 A * | 6/2000 | Sano | ...................... | A01K 83/00 24/908 |
| 6,708,442 B2 * | 3/2004 | Kress | ..................... | A01K 83/06 43/44.2 |
| 7,836,627 B2 * | 11/2010 | Turpin | ................... | A01K 85/00 43/42.06 |
| 7,963,066 B2 | 6/2011 | Perrick | | |
| 2010/0154285 A1 * | 6/2010 | Greenfield | ............. | A01K 85/00 43/42.24 |

* cited by examiner

*Primary Examiner* — Cassandra Davis
(74) *Attorney, Agent, or Firm* — Plager Schack LLP

(57) ABSTRACT

A fishing harness apparatus with enhanced strength and securement of a lure to minimize a likelihood the lure separates from the apparatus in water is provided. The fishing harness apparatus includes a cap with a nose detachably coupled to a fishing line and a strip with a first pointed end and a second end. The first pointed end is disposed within a main body opening of the cap and detachably coupled to the nose of the cap. The first pointed end of the strip is able to pierce through the lure to enable the lure to be secured to the cap. An outer surface of the cap nose deflects water away from the lure, thereby enhancing the securement of the lure to the cap.

10 Claims, 4 Drawing Sheets

FISHING HARNESS APPARATUS WITH ENHANCED BAIT SECUREMENT

BACKGROUND

The embodiments herein relate generally to fishing harness devices or fishing lures. More specifically, embodiments of the invention relate to a fishing harness apparatus used in both fresh and saltwater fishing.

Fishing harness devices and/or lures are used in fresh or saltwater fishing by anglers to attract fish and increase the number and types of fish caught. Various types of lures may be attached to the fishing harness device such as soft plastic baits, fresh baits or frozen baits. There exist a variety of fishing harness devices that secure bait to a fishing line such as U.S. Pat. Nos. 7,963,066, 5,142,811 and 4,848,023. However, these devices do not comprise robust securing mechanisms to attach the bait to the fishing line. More specifically, these harness devices do not have the strength and durability to retain the bait and fishing line connection in the presence of high water pressure and/or flow directed towards the bait. This often results in the bait detaching from the device when in use, which renders the device ineffective and/or impractical in catching fish.

As such, there is a need in the industry for a fishing harness apparatus with enhanced bait securement capabilities, which addresses the limitations of the prior art.

SUMMARY

A fishing harness apparatus with enhanced strength and securement of a lure to minimize a likelihood the lure separates from the apparatus in water is provided. The fishing harness apparatus comprises a cap comprising a nose detachably coupled to a fishing line and a strip comprising a first pointed end and a second end, the first pointed end being disposed within a main body opening of the cap and detachably coupled to the nose of the cap, the first pointed end of the strip being configured to pierce through the lure to enable the lure to be secured to the cap, wherein an outer surface of the cap nose is configured to deflect the water away from the lure, thereby enhancing the securement of the lure to the cap.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
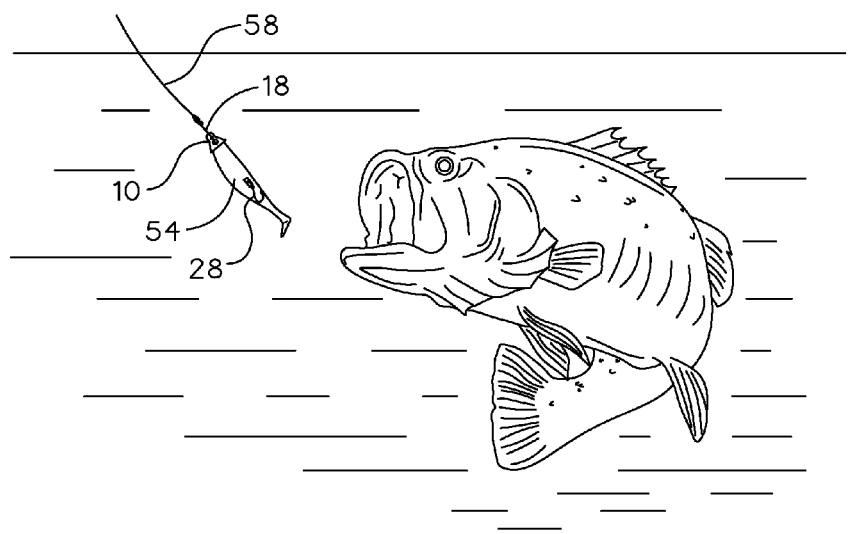
FIG. 1 depicts a perspective view of certain embodiments of the fishing harness apparatus shown in use.
Figure 2:
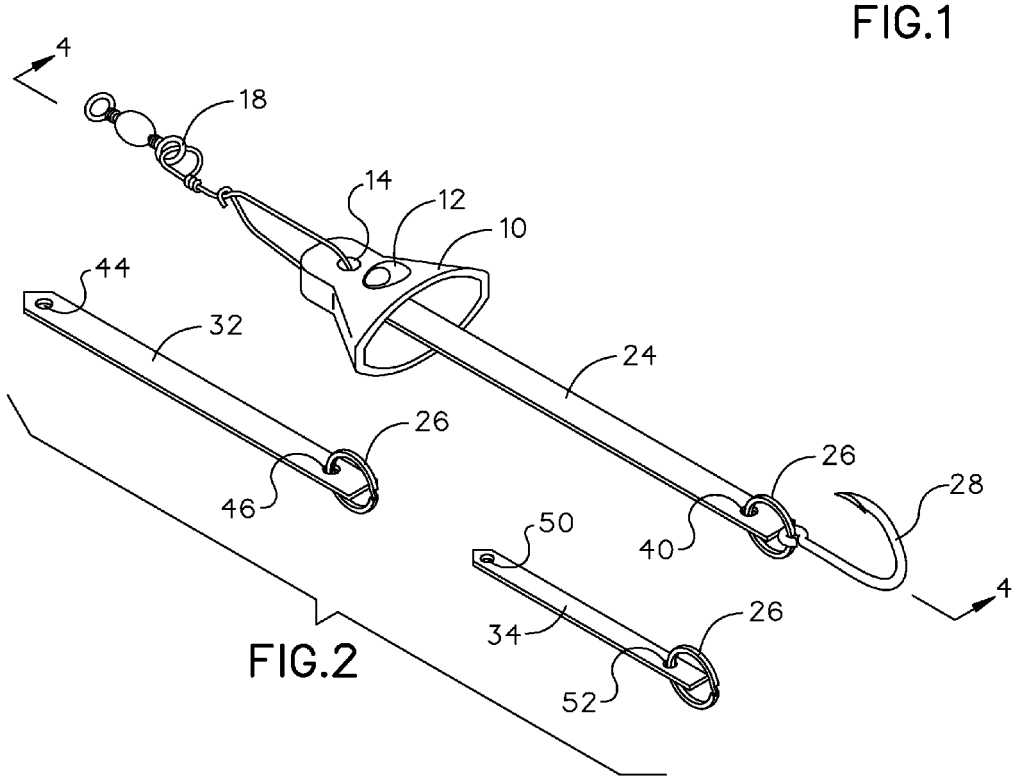
FIG. 2 depicts a perspective view of certain embodiments of the fishing harness apparatus.
Figure 3:
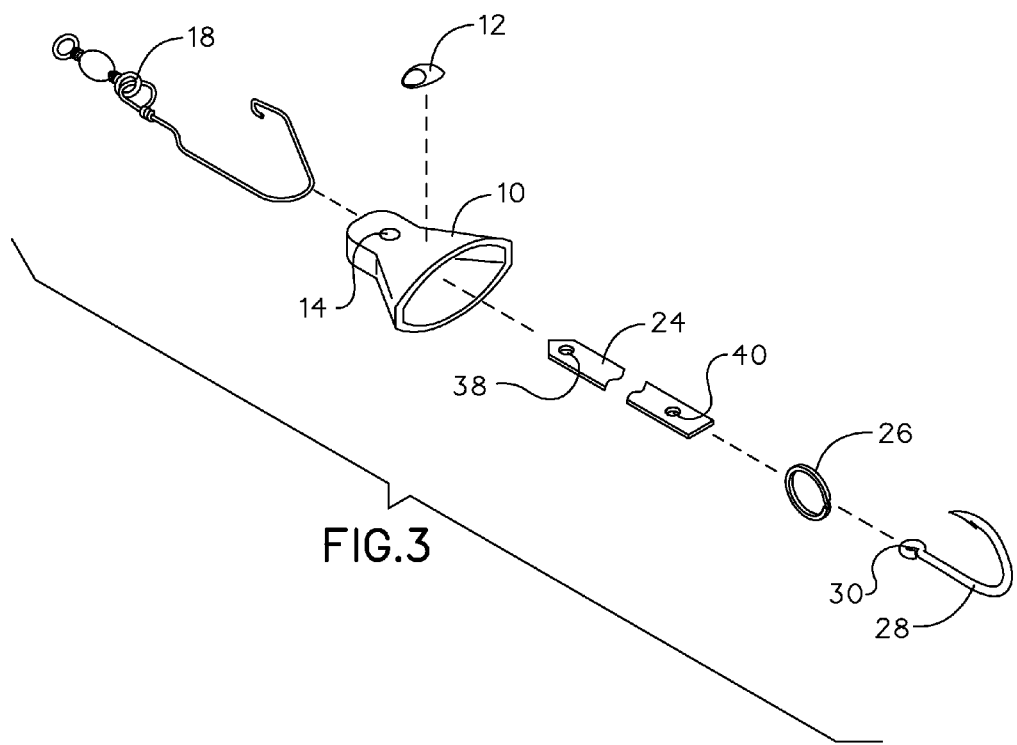
FIG. 3 depicts an exploded view of certain embodiments of the fishing harness apparatus.

As depicted in FIGS. 1-3, the fishing harness apparatus is configured to secure lure 54 to fishing line 58 to catch a fish in freshwater or saltwater. Lure 54 may be any type including, but not limited to, plastic baits, fresh baits or frozen baits. It shall be appreciated that the fishing harness apparatus is versatile and can be trolled, mooched or casted. The fishing harness apparatus comprises cap 10, long strip 24 and hook 28.

Cap 10 is made from hard plastic and comprises a nose portion with cap hole 14 and an opening with an oblong shape. In one embodiment, eye 12 is affixed to an outer portion of the cap. It shall be appreciated that an eye 12 may be affixed to each side of cap 10. Cap 10 is infused with a scent during the manufacturing process, which may include, but is not limited to, anise, chum, garlic, anchovy oil, corn or a blood scent. Cap 10 may comprise any color to help attract a fish such as red, pink, chartreuse, iridescent pearl, or the like.

Long strip 24 is made from 6061 aluminum alloy and is approximately 4" long with a thickness of 0.025", 0.032" or 0.04". Long strip 24 comprises long strip snap hole 38 proximate a first pointed end and long strip ring hole 40 proximate a second end of the strip. In a preferred embodiment, long strip snap hole 38 and long strip ring hole 40 comprise a 5/64" diameter. However, the diameter may vary between 1/16"-5/64". In alternative embodiments, different sized strips may be used instead such as medium strip 32 and short strip 34 as depicted in FIG. 2. Medium strip 32 comprises an approximate length of 3" and short strip 34 comprises an approximate length of 2". Similar to long strip 24, medium strip 32 comprises medium strip snap hole 44 and medium strip ring hole 46. Short strip 34 comprises short strip snap hole 50 and short strip ring hole 52.

Figure 4:
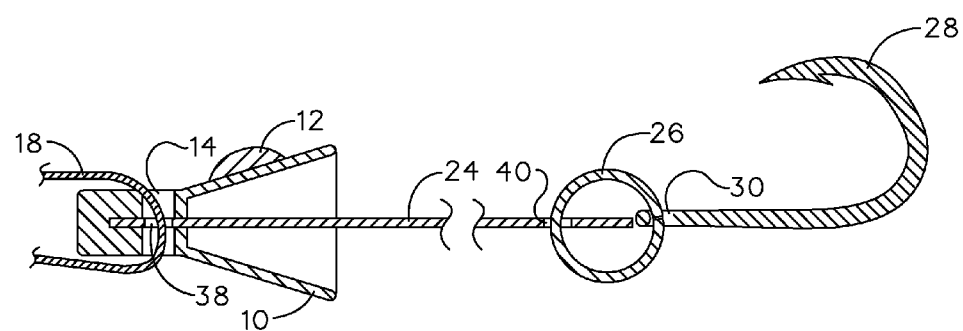
FIG. 4 depicts a section view of certain embodiments of the fishing harness apparatus taken along line 4-4 in FIG. 2.

Hook 28 comprises hook eye 30 and is affixed to long strip 24 by split ring 26, which is disposed within long strip ring hole 40 and hook eye 30. Hook 28 may be any type and sized hook known in the field. The first pointed end of long strip 24 is configured to pierce through lure 54. As depicted in FIG. 4, the first pointed end of long strip 24 is then disposed within the opening of cap 10 and an interior slot within the nose portion. This aligns cap hole 14 with long strip snap hole 38. Coastlock snap swivel 18 is used to connect cap 10 to fishing line 58. Specifically, a hook portion of coastlock snap swivel 18 is disposed within cap hole 14 and long strip snap hole 38. The hook portion of coastlock snap swivel 18 is then snapped onto itself.

Figure 5:
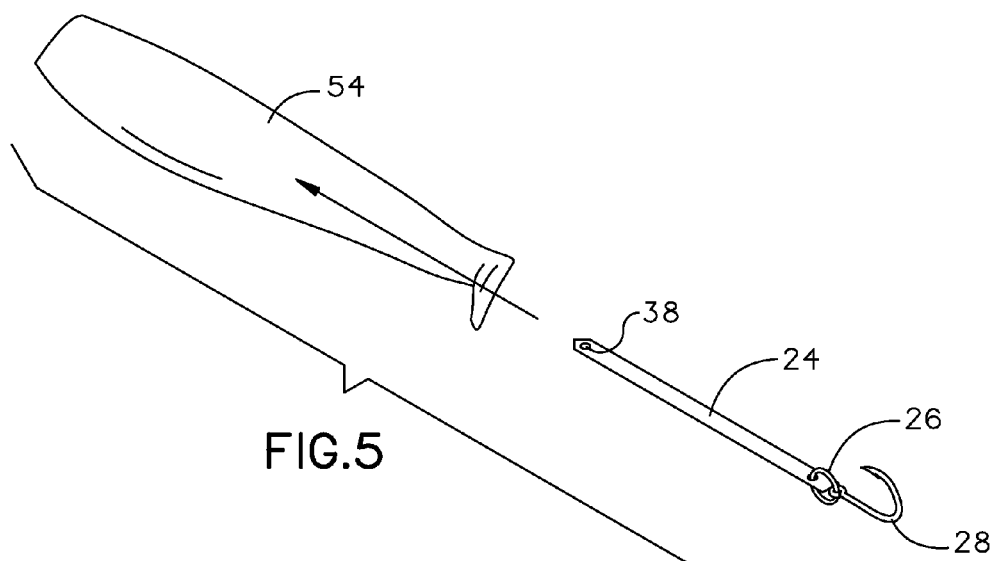
FIG. 5 depicts a perspective view of certain embodiments of the fishing harness apparatus illustrating the insertion of long strip 24 into lure 54.
Figure 6:
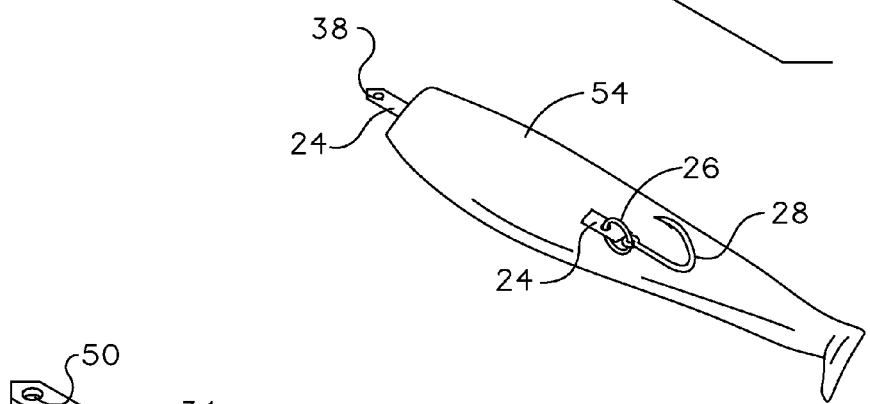
FIG. 6 depicts a perspective view of certain embodiments of the fishing harness apparatus illustrating long strip 24 inserted into lure 54.

In operation, the fishing harness apparatus is assembled by securing hook 28 to long strip 24 with split ring 26. The pointed end of long strip 24 is inserted through lure 54 as depicted in FIG. 5. In this configuration, lure 54 is secured to long strip 24 as depicted in FIG. 6. The pointed end of long strip 24 is disposed within the opening of cap 10 and inserted within the interior slot in the nose portion of cap 10. The hook portion of coastlock snap swivel 18 is disposed within cap hole 14 and long strip snap hole 38, then snapped onto itself. Fishing line 58 is disposed through coastlock snap swivel 18 to complete the assembly. This creates secured connections between fishing line 58, cap 10, lure 54 and long strip 24. Fishing line 58 pulls fishing harness apparatus through the water. The nose portion of cap 10 deflects water away from lure 54, which minimizes water pressure and/or flow directed at the lure. This increases the chance that lure 54 is retained by the fishing harness apparatus when in use. Fish are attracted to the scent and color of cap 10 and lure 54. A fish that bites lure 54 becomes hooked to the fishing harness apparatus by hook 28.

Figure 7:
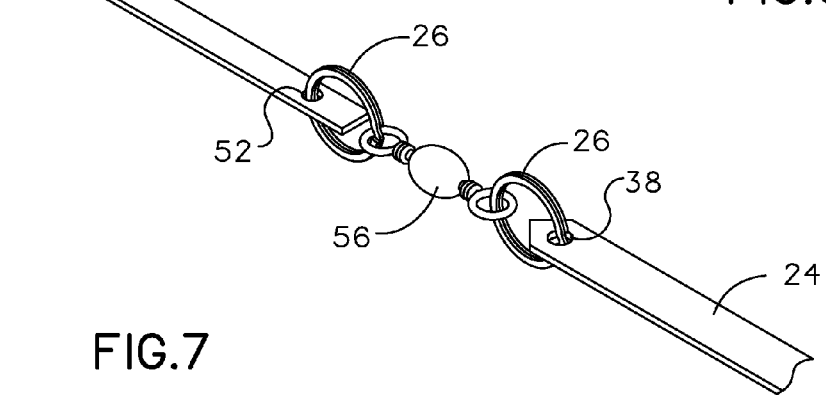
FIG. 7 depicts a perspective view of certain embodiments of the fishing harness apparatus illustrating the attachment of long strip 24 and short strip 34 using swivel 56.

In an alternative embodiment, multiple strips of any size can be attached together prior to being secured to cap 10. As depicted in FIG. 7, in an exemplary embodiment, short strip 34 is connected to long strip 24 by swivel 56 and split rings 26. This stacking of strips allows a user to secure additional lures 54 to cap 10 to enhance the fishing harness apparatus' ability to attract fish in the water.

Figure 8:
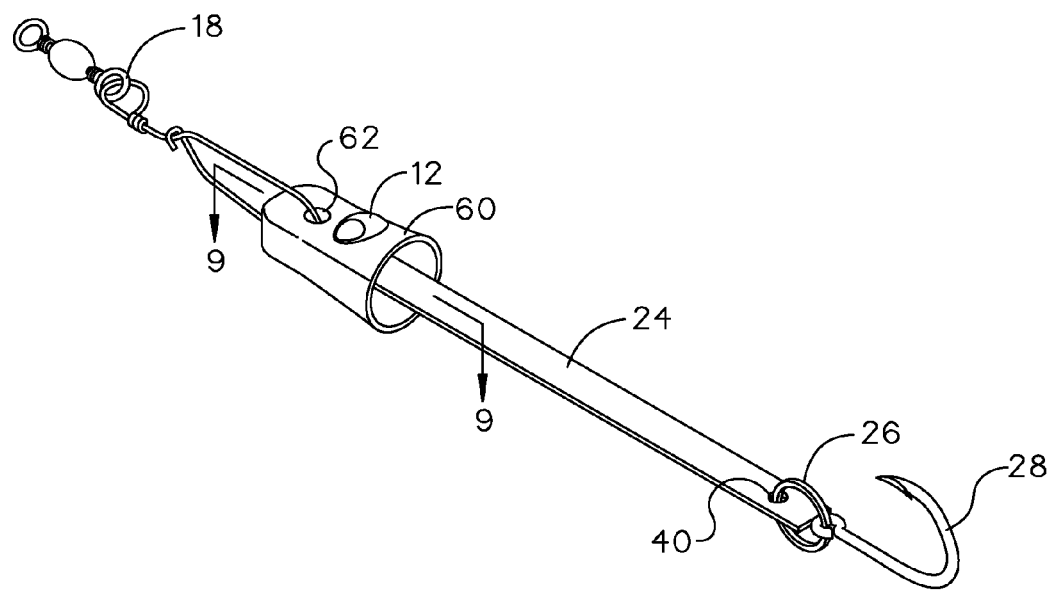
FIG. 8 depicts a perspective view of an alternative embodiment of the fishing harness apparatus.
Figure 9:
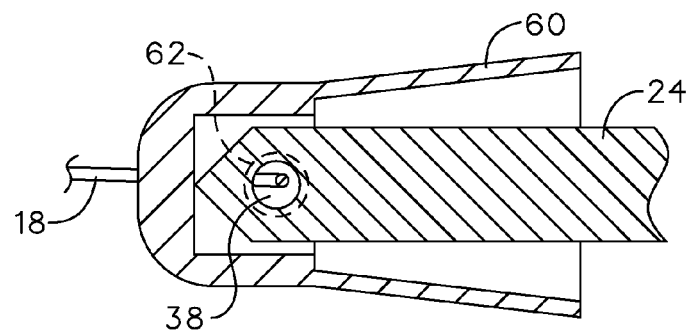
FIG. 9 depicts a section view of the alternative embodiment of the fishing harness apparatus taken along line 9-9 in FIG. 8.

It shall be appreciated that cap 10 may have alternative shapes and dimensions. FIG. 8 depicts alternate cap 60, which comprises alternate cap hole 62, a nose portion and an opening with a circular shape. The nose portion of cap 60 remains the same as the nose portion for cap 10. The circular shape of the opening of cap 60 is suitable for use with wormlike shaped lures such as shrimp. In contrast, the oblong shape of the opening of cap 10 is suitable for use with fish shaped lures. As such, it shall be appreciated that the shape of the cap is designed to blend in with the shape of lure 54. As depicted in FIG. 9, the opening wall of cap 60 is bent outward from the nose portion. However, the wall of the opening can be modified to remain flush with the side outer edges of the nose portion. In a preferred embodiment, cap 60 has approximately a 0.5" height and 0.5" diameter.

It shall be appreciated that the components of the fishing harness apparatus described in several embodiments herein may comprise any alternative known materials in the field and be of any color, size and/or dimensions. It shall be appreciated that the components of the fishing harness apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A fishing harness apparatus with enhanced strength and securement of a lure to minimize a likelihood the lure separates from the apparatus in water, the fishing harness apparatus comprising:
   a cap comprising a nose in a front portion of the cap configured to couple to a fishing line and an opening extending to a rear portion of the cap, the cap being completely infused with a scent; and
   a strip comprising a first pointed end and a second end, the first pointed end being disposed within the opening of the cap and detachably coupled to the nose of the cap, the first pointed end of the strip being configured to pierce through the lure to enable the lure to be secured to the cap, wherein an outer surface of the cap nose is configured to deflect the water away from the lure, thereby enhancing the securement of the lure to the cap.

2. The fishing harness apparatus of claim 1, further comprising a coastlock snap swivel with a hook portion disposed within an aperture in the nose of the cap and coupled to a portion of the coastlock snap swivel.

3. The fishing harness apparatus of claim 2, wherein the nose of the cap comprises an interior slot configured to receive the first pointed end of the strip.

4. The fishing harness apparatus of claim 3, wherein the strip comprises a first aperture proximate the first end and a second aperture proximate the second end, wherein the hook portion of the coastlock snap swivel is disposed within the first aperture of the strip.

5. The fishing harness apparatus of claim 4, further comprising a hook detachably coupled to the second aperture of the strip by a split ring.

6. The fishing harness apparatus of claim 5, infused in the cap comprises anise, chum or garlic.

7. The fishing harness apparatus of claim 6, further comprising an eye affixed to an outer portion of the cap.

8. The fishing harness apparatus of claim 7, wherein the opening of the cap comprises an oblong shape.

9. The fishing harness apparatus of claim 7, wherein the opening of the cap comprises a circular shape.

10. The fishing harness apparatus of claim 7, wherein the strip is made from 6061.

\* \* \* \* \*